United States Patent
Gryck et al.

(10) Patent No.: US 7,272,712 B1
(45) Date of Patent: Sep. 18, 2007

(54) DATA STRUCTURE AND METHOD FOR MANAGING MODULES ASSOCIATED WITH A KERNEL

(75) Inventors: Janet H. Gryck, Belle Mead, NJ (US); Vandana Tangri, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/605,102

(22) Filed: Nov. 28, 2006

Related U.S. Application Data

(62) Division of application No. 10/464,092, filed on Jun. 18, 2003, now Pat. No. 7,171,550.

(51) Int. Cl.
*G06F 1/24* (2006.01)
*G06F 9/00* (2006.01)
*G06F 15/177* (2006.01)

(52) U.S. Cl. .............................. 713/100; 713/1; 713/2
(58) Field of Classification Search ................. 713/100
See application file for complete search history.

(56) References Cited

U.S. PATENT DOCUMENTS

| 5,634,058 A * | 5/1997 | Allen et al. .................. 717/163 |
| 7,096,473 B2 * | 8/2006 | Ruget et al. ................. 719/321 |

\* cited by examiner

*Primary Examiner*—Rehana Perveen
*Assistant Examiner*—Stefan Stoynov

(57) ABSTRACT

A system and method for registering and unregistering a module with a kernel includes a processing unit communicating with the kernel. A hierarchical kernel registry service communicates with the kernel and includes an identifier of the module. The processing unit causes the module to be one selected from registered with the kernel and unregistered from the kernel as a function of a hierarchical position of the identifier within the kernel registry service.

20 Claims, 6 Drawing Sheets

DATA STRUCTURE AND METHOD FOR MANAGING MODULES ASSOCIATED WITH A KERNEL

CROSS REFERENCES TO RELATED APPLICATIONS

This application is a divisional of the U.S. patent application Ser. No. ,10/464,092, filed Jun. 18, 2003, now U.S. Pat. No. 7,171,550 and entitled "Data Structure and Method for Managing Modules Associated With A Kernel."

BACKGROUND OF THE INVENTION

The present invention relates to dynamically configurable kernels incorporating various modules. It will be appreciated, however, that the invention is also amenable to other like applications.

One component of a computing system is an operating system (OS) kernel, which includes a plurality of modules (e.g., drivers) that allow the computing system to communicate with peripheral devices such as a printing device. The modules are compiled and subsequently linked to form the kernel. When the system is started or "booted-up," the kernel is loaded into memory.

In some systems, the kernel is static, which means the kernel is built/re-built whenever a new module (or new version of a module) is linked (registered) to the operating system (OS) kernel. In other systems, the kernel is dynamic, which permits a new module (or new version of a module) to be linked to the operating system (OS) kernel without rebuilding the kernel or rebooting the system. In either system, it is necessary to manage modules linked to the kernel. In other words, it is necessary to maintain a list (index) of modules (or versions of modules) that are currently registered with the kernel, a list of modules (or versions of modules) that are not currently registered with the kernel but that are to be registered in the future, and a list of modules that are currently registered with the kernel but that are to be unregistered in the future.

Currently, one means for managing a kernel includes creating and/or accessing one or more registration files stored on a computer readable medium within a computing system. The registration files, which are typically text files, identify the modules that are currently registered with the kernel. Furthermore, the files may identify multiple versions of one or more of the modules that are currently registered with the kernel. Registering multiple versions of a module with a kernel simply means that the kernel is "aware" of each of those versions. Only one of the registered versions (e.g., the active version) is actually used by the kernel when a call is made to the module. The text files also identify modules (and versions thereof) that are currently not registered with the kernel but that are to be registered in the future, along with modules (and versions thereof) that are currently registered but that are to be unregistered in the future.

As discussed above, the registration files are typically text files and, furthermore, are "flat," which means the entries in the files have no structured interrelationship. For example, a flat file used within the current system may simply include a list of file names (including the full path) representing the modules that are currently registered with the kernel. Other flat, text files in the current system may include file names of at least one of various versions of the modules that are currently registered with the kernel, modules and/or versions that are to be registered with the kernel in the future, and modules and/or versions that are to be unregistered from the kernel in the future.

Since a plurality of registration files are currently used for managing the kernel, the OS manages the location and name of each of these files. This additional layer of management is cumbersome and, furthermore, utilizes computer resources that may affect the efficiency of the system.

Additionally, there are drawbacks associated with text registration files. For example, the computing system must be sufficiently loaded to accomplish the relatively high-level processing used for text files (e.g., the system may be completely booted). Therefore, text registration files preclude boot-time loading. Furthermore, text files are typically accessible to system users and, therefore, may be easily corrupted and/or inadvertently deleted.

The present invention provides a new and improved apparatus and method which addresses the above-referenced problems.

SUMMARY OF THE INVENTION

A system for registering and unregistering a module with a kernel includes a processing unit communicating with the kernel. In one embodiment, a hierarchical kernel registry service communicates with the kernel and includes an identifier of the module. The processing unit causes the module to be selected from one of registered with the kernel and unregistered from the kernel as a function of a hierarchical position of the identifier within the kernel registry service.

In another embodiment, a method for managing modules associated with a kernel identifies a first module to registered with the kernel or unregistered from the kernel. Configuration data for the first module is linked to a planned branch of a kernel registry system. The first module is registered or unregistered as a function of whether the configuration data for the first module is also linked to a dynamic branch of the kernel registry system.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

The following includes definitions of exemplary terms used throughout the disclosure. Both singular and plural forms of all terms fall within each meaning:

"Computer Readable Medium", as used herein, includes but is not limited to any memory device, storage device, compact disc, floppy disk, or any other medium capable of storing data temporarily and/or permanently that can be interpreted by a computer.

"Software", as used herein, includes but is not limited to one or more computer executable instructions, routines, algorithms, modules or programs including separate applications or from dynamically linked libraries for performing functions and actions as described herein. Software may also be implemented in various forms such as a servlet, applet, stand-alone, plug-in or other type of application. Software can be maintained on various computer readable mediums as is known in the art.

"Signal", as used herein, includes but is not limited to one or more electrical signals, analog or digital signals, one or more instructions, a bit or bit stream, or the like, which, in one embodiment, is executable on a computing device. The term "command" is synonymous with "signal."

"Hardware", as used herein, includes but is not limited to electronic devices (e.g., a central processing unit (CPU), memory, display, etc.) for at least one of input, output, and storage within a computing device. Some of the hardware may include electromechanical parts (e.g., keyboard, printer, disk drives, tape drives, loudspeakers). Furthermore, completely non-electronic (mechanical, electromechanical, hydraulic, biological) hardware are also contemplated.

"Kernel", as used herein, includes but is not limited to a component of an operating system (OS) within a computing device. The kernel provides services that may be used by other parts of at least one of the OS, the hardware, and applications run by the computing device. For example, the kernel is typically responsible for at least one of memory management, process and task management, and disk management.

"Kernel Module", as used herein, includes but is not limited to independent pieces of software that provide an interface between an OS included within a computing device and other devices that communicate with the OS (e.g., at least one of the hardware and peripheral devices). Generally speaking, a kernel module is a section of software in the kernel responsible for supporting a specific feature or capability. For example, file system types and device drivers are kernel modules.

"Command Line Interpreter" (CLI), as used herein, includes but is not limited to an interface between a user and the kernel. The CLI, also referred to as a "shell," interprets commands entered by, for example, a user and arranges for the commands to be executed by, for example, a CPU.

In one embodiment, the present system and method provide the capability of managing modules that are to be registered and unregistered from a kernel.

Figure 1:
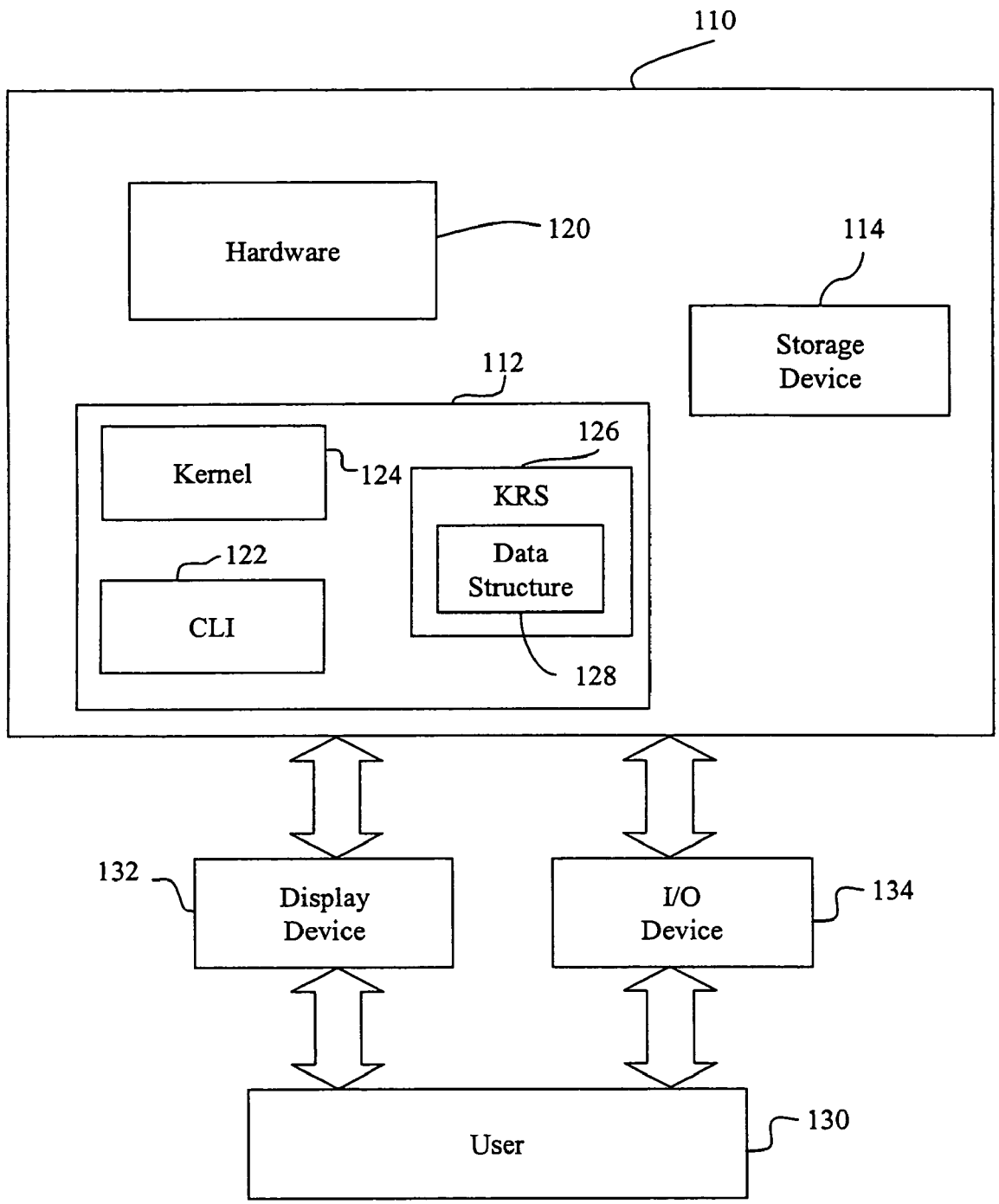
FIG. 1 illustrates a system in accordance with one embodiment of the present invention.

Illustrated in FIG. 1 is a simplified block diagram of an exemplary system 110 for managing modules in one embodiment of the present invention. In one example, the system 110 is referred to as a computing device. The system 110 includes an operating system (OS) 112, a storage device 114 (e.g., a disk drive including a computer readable medium or any other means for storing), and hardware 120 (which may include a processing device (e.g., a CPU)). The computer readable medium of the storage device 114 may store at least one of computer executable program code (e.g., software) and computer data code (e.g., a data file). The OS 112 includes a command line interpreter (CLI) (e.g., a shell) 122, a kernel 124, and a kernel registry system (KRS) 126. In one embodiment, the KRS 126 includes binary (e.g., non-text) data representing a hierarchical data structure 128 (e.g., a hierarchical data file) that identifies: a) modules (or module versions) that are not currently registered with the kernel but that are desired to be registered; b) modules (or module versions) that are currently registered and that may be unregistered from the kernel 124; and c) modules (or module versions) that are currently registered but that may not be unregistered from the kernel 124. A user 130 communicates with the system 110 via at least one of a display device 132 (e.g., a display monitor) and an input/output (I/O) device 134 (e.g., at least one of a keyboard, mouse, and a touch-screen display device).

In one embodiment, the hardware 120 and the storage device 114 communicate with the OS 112 via the kernel 124. Furthermore, the display device 132 and the I/O device 134, along with the user 130, communicate with the OS 112 via the CLI 122. In this sense, the CLI 122 is a section of the OS 112 that interfaces with the outside world.

In the illustrated embodiment, the KRS 126 may include signals on a computer readable medium included within the OS 112; however, other embodiments, in which the KRS 126 is not included within the OS 112 (e.g., the KRS 126 is embodied as signals on a computer readable medium included within the storage device 114) are also contemplated.

Figure 2:
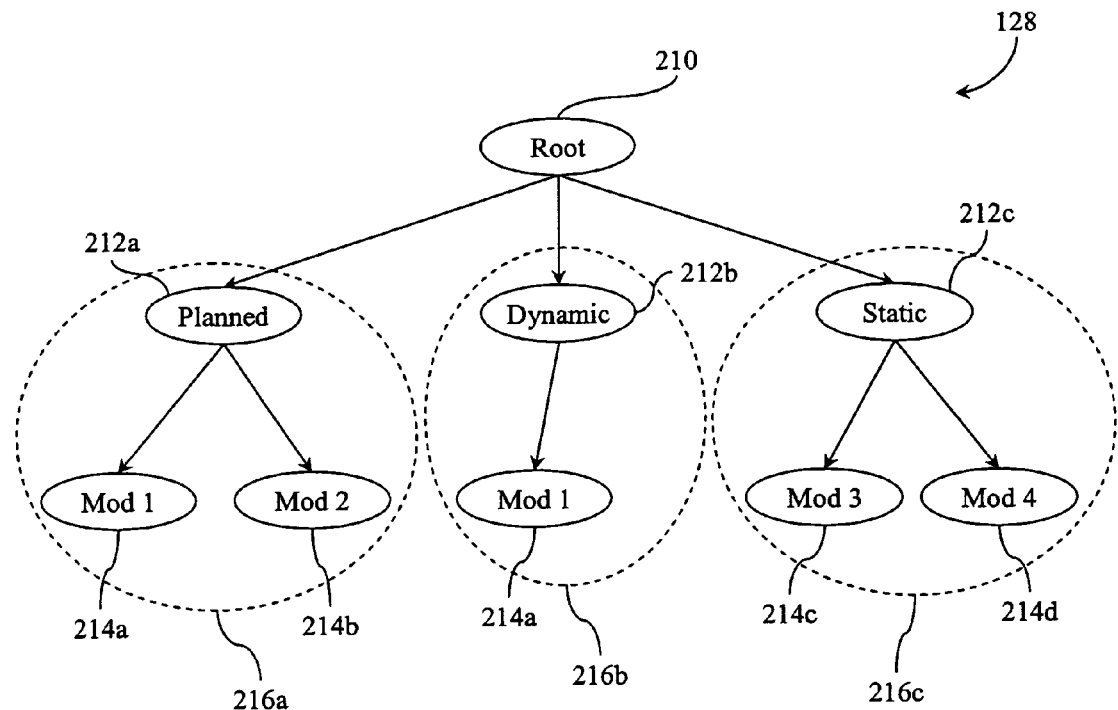
FIG. 2 illustrates an exemplary diagram of a hierarchy of a data structure before modules are managed according to one embodiment of the present invention.

Illustrated in FIG. 2 is an exemplary diagram of the hierarchy of the data structure 128, in one embodiment of the present invention, before a module (or a module version) is managed according to the present embodiment. In the example illustrated in FIG. 2, the hierarchy of the data structure 128 includes a common node 210 (e.g., a root). A plurality of nodes 212 directly communicate with the common node 210. In the illustrated embodiment, three (3) nodes 212a, 212b, 212c directly communicate with the common node 210. However, other embodiments, in which different numbers of nodes directly communicate with the common node 210 are also contemplated. The node 212a is referred to as a planned node; the node 212b is referred to as a dynamic node; and node 212c is referred to as a static node. Nodes 214, which are referred to as modules (or versions of modules), directly communicate with the nodes 212.

Because, for example, no intermediate nodes exist between the nodes 210, 212a, the nodes 210, 212a "directly" communicate with each other. On the other hand, although the node 214b directly communicates with the node 212a, the node 214b indirectly communicate with the common node 210 via the node 212a.

The relationships of the nodes 210, 212 and modules 214 represent the hierarchy of the data structure 128. Furthermore, as discussed in more detail below, respective positions of the modules 214 within the hierarchy of the data structure 128 (e.g., within the branches 216) are identified and used for determining how the modules 214 are to be managed (e.g., if a module 214 is to be registered or unregistered from the kernel).

The nodes 214a, 214b, which represent first and second modules (e.g., Module 1 (Mod 1) and Module 2 (Mod 2)) or versions, respectively, directly communicate with the planned node 212a. The node 214a (e.g., Module 1) also directly communicates with the dynamic node 212b. Nodes 214c, 214d, which represents third and fourth modules (e.g., Module 3 (Mod 3) and Module 4 (Mod 4)), directly communicate with the static node 212c.

Each of the nodes 212 and respective modules 214 represent branches 216 (e.g., data structures) that communicate with the common node 210. More specifically, the branch 216a includes the planned node 212a and the modules 214a, 214b; the branch 216b includes the dynamic node 212b and the module 214a; and the branch 216c includes the static node 212c and the modules 214c, 214d. For reasons discussed below, the branch 216a represents a means for identifying any modules to be registered with the kernel, the branch 216b represents a means for identifying any modules currently registered with the kernel and that may be dynamically unregistered from the kernel, and the branch 216c represents a means for identifying any modules permanently registered with the kernel.

With reference to FIGS. 1 and 2, nodes directly communicating with the planned node 212a (e.g., the nodes 214a, 214b) represent modules (e.g., the Module 1 and the Module 2) that are either 1) currently not registered with the kernel 124, but that are to be registered or 2) modules that are currently registered with the kernel 124, but that are to be unregistered. In other words, the nodes communicating with the planned node 212a represent modules that are queued to be either registered with or unregistered from the kernel 124. Nodes directly communicating with the dynamic node 212b represent modules that are currently registered with the kernel 124 and that may be unregistered in the future. Nodes directly communicating with the static node 212c represent modules that are currently registered with the kernel 124 but that may not be unregistered.

Figure 3:
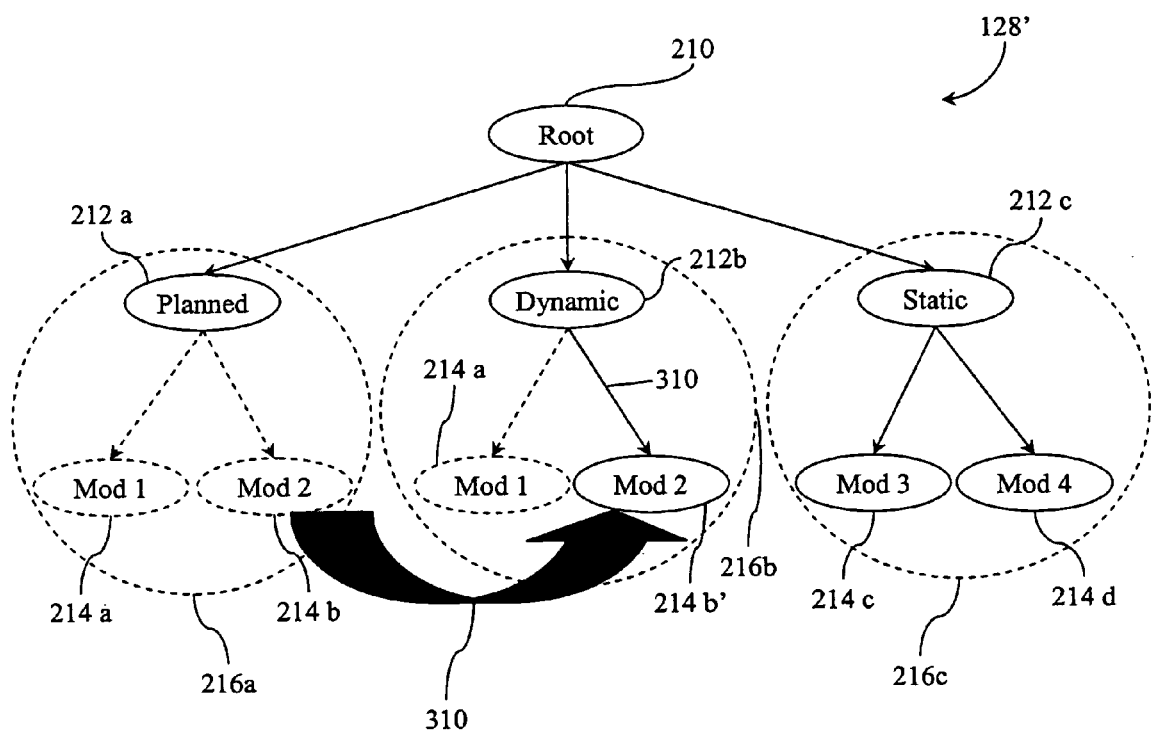
FIG. 3 illustrates an exemplary diagram of the hierarchy of the data structure after modules are managed according to one embodiment of the present invention.

Illustrated in FIG. 3 is an exemplary diagram of the hierarchical data structure 128' associated with the KRS 126, in one embodiment, after modules (or module versions) are managed according to the present embodiment. More specifically, the Module 1 214a, which is illustrated in FIG. 3 using dashed lines, previously directly communicated with both the planned node 212a and the dynamic node 212b. The Module 2 214b, which is illustrated in FIG. 3 using dashed lines, previously communicated directly with the planned module 212a. An arrow 310 indicates the Module 2 214b', which is illustrated in FIG. 3 using solid lines, currently communicates directly with the dynamic node 212b. The process through which Module 1 214a is unregistered from the kernel 124 (see FIG. 1) (i.e., stops communicating directly with the planned and dynamic nodes 212a, 212b, respectively) and the process through which Module 2 214b is registered with the kernel (i.e., stops communicating directly with the planned node 212a and begins communicating directly with the dynamic node 212b) (after which Module 2 is referred to as 214b') is discussed in more detail below.

Figure 4:
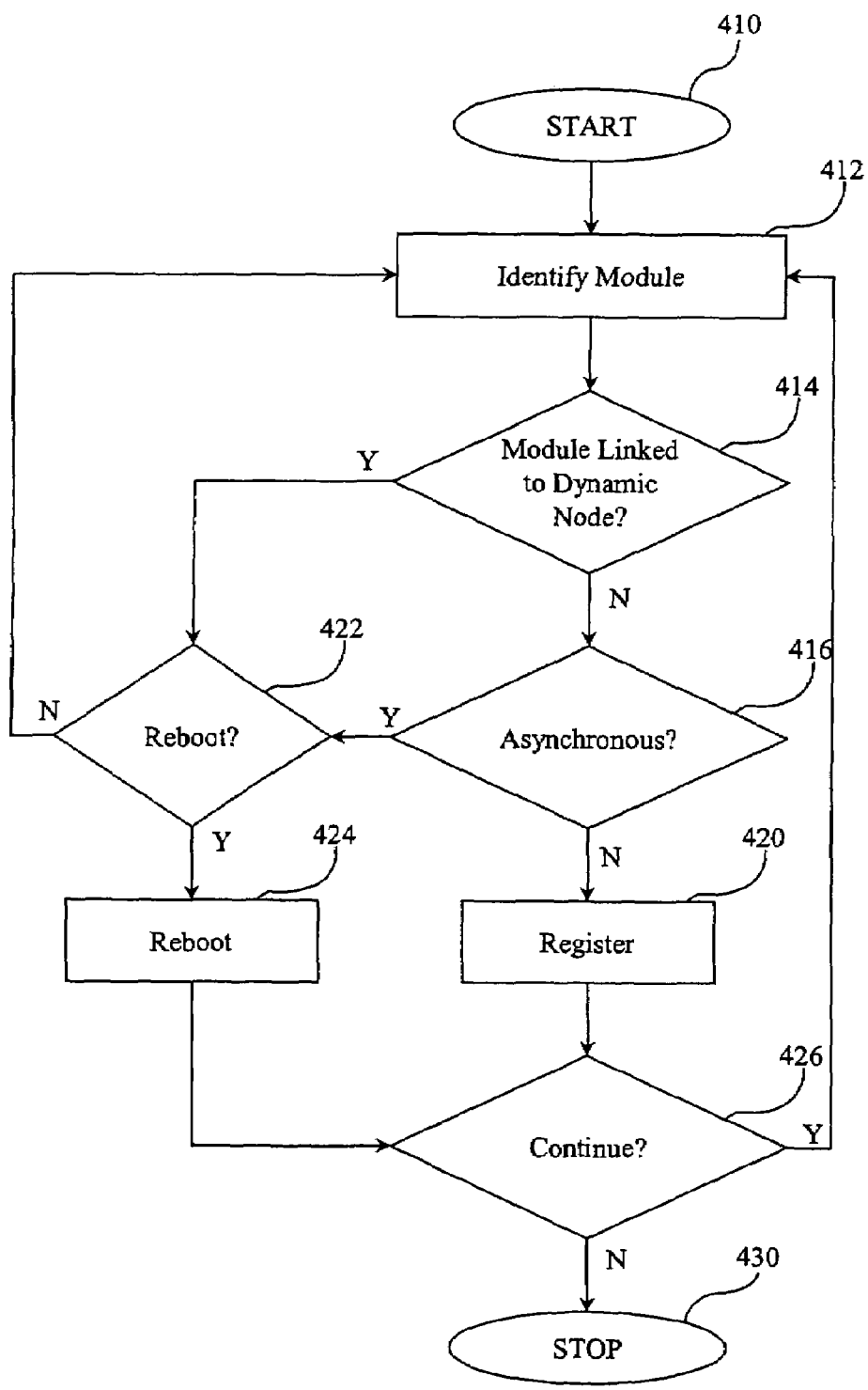
FIG. 4 is an exemplary methodology of managing the module in accordance with one embodiment of the present invention.

Illustrated in FIG. 4 is an exemplary methodology of the system shown in FIG. 1 for managing modules associated with the kernel 124. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

The process for managing the modules 214 (see FIGS. 2 and 3) starts in a block 410. A module 214 (see FIGS. 2 and 3) to be registered with, or unregistered from, the kernel 124 (see FIG. 1) is identified, for example, by the user 130 (see FIG. 1) (block 412). More specifically, the user communicates with the OS 112 (see FIG. 1) via the I/O and display devices 132, 134 (see FIG. 1) to review and/or load one or more modules stored on the device 114 (see FIG. 1). For example, the display device may display general identifiers 510 (see FIG. 5) to the user indicating that, as shown in FIG. 2, configuration data for the Module 1 214a is associated with (linked to) both the planned node 212a and the dynamic node 212b, that configuration data for the Module 2 is linked to the planned node 212a, and configuration data for both the Modules 3 and 4 214c, 214d are associated with the static node 212c. It is to be understood that the Modules 1 and 2 214a, 214b, respectively, may be different versions of a piece of software intended for the same purpose (e.g., different versions of a driver) or different pieces of software intended for different purposes (e.g., different drivers). As discussed in more detail below, modules queued to be registered with, or unregistered from, the kernel in the future have configuration data linked to the planned node 212a. Therefore, the user identifies (see the block 412) one of the modules 214a, 214b associated with the planned node 212a. In the present example, the user identifies the Module 2 214b to be registered with the kernel 124 (see FIG. 1) in the block 412.

Modules which may be registered with, or unregistered from, the kernel in the future have configuration data linked to the planned node 212a. For example, since the Module 2 214b is associated with the planned node 212a (and not simultaneously associated with the dynamic node 212b), it is evident that the Module 2 214b is currently not registered with the kernel 124 (see FIG. 1) but is queued to be registered with the kernel 124 in the future. On the other hand, since the Module 1 214a is simultaneously associated with both the planned and dynamic nodes 212a, 212b, Module 1 214a is currently registered with the kernel but is queued to be unregistered from the kernel in the future.

Figure 5:
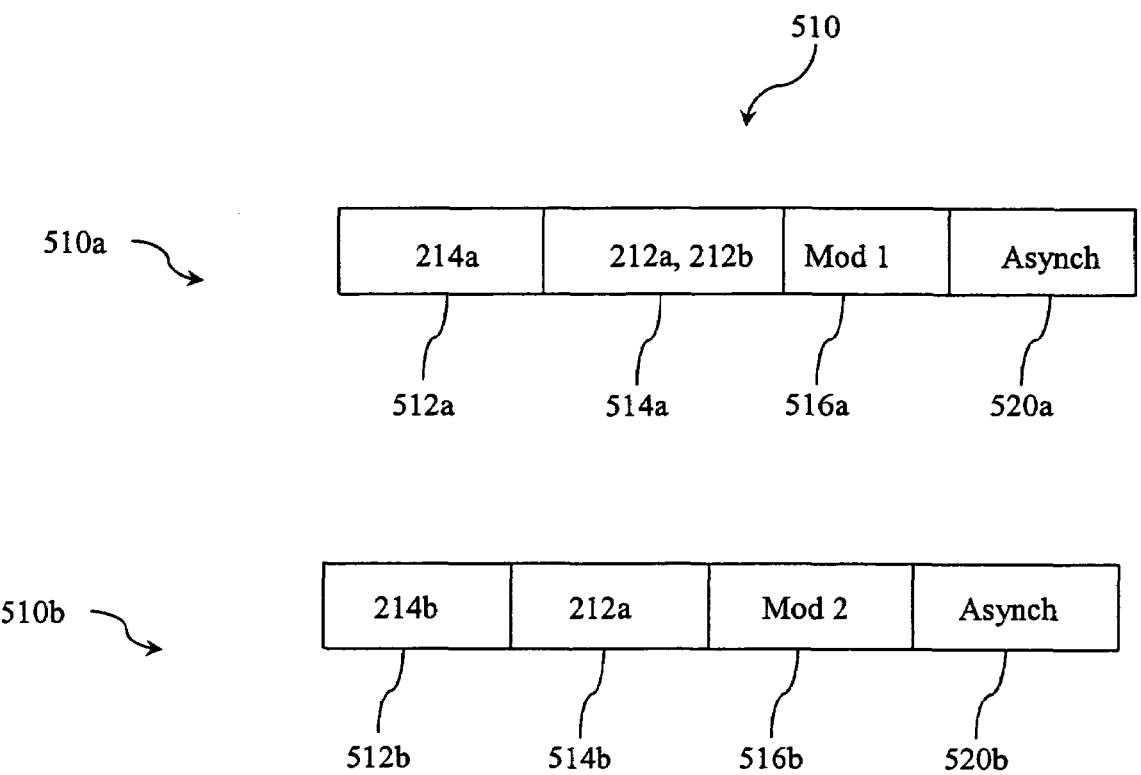
FIG. 5 is a representation of a general identifier in accordance with one embodiment of the present invention.

With reference to FIG. 5, general identifiers 510a, 510b of the Modules 1 and 2 214a, 214b within the data structure 128 (see FIG. 1) may include one or more sub-identifiers. For example, the sub-identifiers may include a node identifier 512, a parent node identifier 514, a name identifier 516, and a registration method identifier 520. The general identifier 510a includes a node identifier 512a, which identifies the node of the module within the data structure. In the current example, the node identifier 512a for the Module 1 is 214a. The parent node identifier 514a identifies, for example, the node(s) within the data structure 128 (see FIG. 2) from which the module depends. In the current example, the parent node identifier 512a for the Module 1 is 212a, 212b. The name identifier 516a identifies, for example, a name associated with the module. In the current example, the name identifier for the Module 1 is "Mod 1." The registration method identifier 520a acts as a flag and identifies, for example, how the module is to be registered with the kernel 124 (see FIG. 1). In the current example, the flag 520a is set as "ASynch" (as opposed to "Synch"), which indicates that the module is to be registered asynchronously (as opposed to synchronously). The terms asynchronous and synchronous refer to registration methods that identify how the module is to be registered with the kernel. Modules that are registered with a kernel asynchronous are registered during a subsequent rebuild of the kernel. Modules that are registered with a kernel synchronously are registered with the kernel without waiting until a subsequent rebuild of the kernel. With reference to the general identifier 510b, the node identifier 512b for the Module 2 is 214b, the parent node identifier 514b for the Module 2 is 212a, the name identifier 516b for the Module 2 is "Mod 2," the registration method identifier 520b is set as "ASynch." Although the general identifiers 510 are described as including four (4) components 512, 514, 516, 520, it is to be understood that in other embodiments, in which the general identifiers 510 include other numbers of components, are also contemplated.

If the general identifiers displayed do not include a module the user 130 (see FIG. 1) desires to register, it is to be understood that the user may load a new module into the storage device 114 (see FIG. 1) via the I/O device 134 (see FIG. 1). Once the new module is loaded into the storage device, a general identifier of that module is displayed to the user and may be identified in the block 412. In this manner, the user may load a new module into the storage device 114 and identify (flag) that module to be registered with or unregistered from the kernel 124 (see FIG. 1) in the future.

With reference again to FIGS. 2-4, since it is assumed that the module identified in the block 412 is associated with the planned node 212a, a determination is made (see block 414) whether the configuration data for the module identifier is also linked to the dynamic node 212b. As discussed above, if the configuration data for the module identifier is simultaneously linked to the dynamic node 212b, that module is set to be unregistered from the kernel 124 (see FIG. 1). The process of unregistering the module from the kernel 124 is discussed in more detail below.

If the configuration data is not simultaneously linked to both the planned and dynamic nodes 212a, 212b, it is determined that the module is planned to be registered with the kernel. Therefore, a determination is made (see block 416) whether the module is to be registered with the kernel asynchronously (as opposed to synchronously). More specifically, the hardware 120 determines if the flag 520 (see FIG. 5) is set to either "ASynch" or "Synch." If the flag is set as "Synch" (i.e., the determination in the block 416 is that the module is to be registered with the kernel 124 synchronously), the module is registered (see block 420) upon the hardware 120 (see FIG. 1) receiving a registration request from, for example, the user 130 (see FIG. 1). The registration process is described in more detail below. Once the module is registered, control returns to the block 412 for identifying another module to be registered/unregistered.

If, on the other hand, the flag is set as "ASynch," it is determined in the block 416 that the module is to be registered with the kernel 124 (see FIG. 1) asynchronously. In other words, the module is planned to be registered with the kernel during a subsequent kernel build. The kernel is built/re-built when the OS 112 (see FIG. 1) is reset (rebooted). Therefore, a determination is made whether to reset (reboot) the OS (see block 422). It is to be understood that the OS may be rebooted at any time. In this regard, the decision whether to reboot the OS is incorporated into the methodology as a discrete block (e.g., the block 422) merely for purposes of illustration. If the OS is not to be rebooted, another module to be registered/unregistered is identified in the block 412. If, on the other hand, the OS is to be rebooted, the OS is rebooted (see block 424), which is discussed in more detail below. The module identified in the block 412, along with any other modules currently linked to the planned node 212a, is/are asynchronously registered/unregistered with/from the kernel during the OS reboot (see the block 424).

After the OS is rebooted, a determination is made whether to continue the process (see block 426). For example, the user may transmit a signal to the hardware via the I/O device 134 (see FIG. 1) for indicating whether to continue the process. If the process is to continue, control returns to the block 412 for identifying another module to be registered/unregistered. Otherwise, the process stops (see block 430).

As discussed above, if it is determined in the block 414 that the configuration data for the module identifier identified in the block 412 is simultaneously linked to the dynamic node 212b, the module is to be unregistered from the kernel 124 (see FIG. 1). Although it is contemplated to unregister a module either asynchronously or synchronously, the current example is described with reference to unregistering a module asynchronously. Therefore, if it is determined that the module is to be unregistered (see the block 414), the determination is made whether to reboot the OS (see the block 422). If it is determined not to reboot the OS at the present time, control returns to the block 412 for identifying another module to be registered/unregistered. Otherwise, if it is determined to reboot the OS at the present time, the OS is rebooted (see the block 424). The module identified in the block 412, along with any other modules currently linked to the planned node 212a, is/are asynchronously registered/unregistered with/from the kernel during the OS reboot (see the block 424). As discussed above, a determination is made (see the block 426) whether to continue the process after the OS is rebooted.

Figure 6:
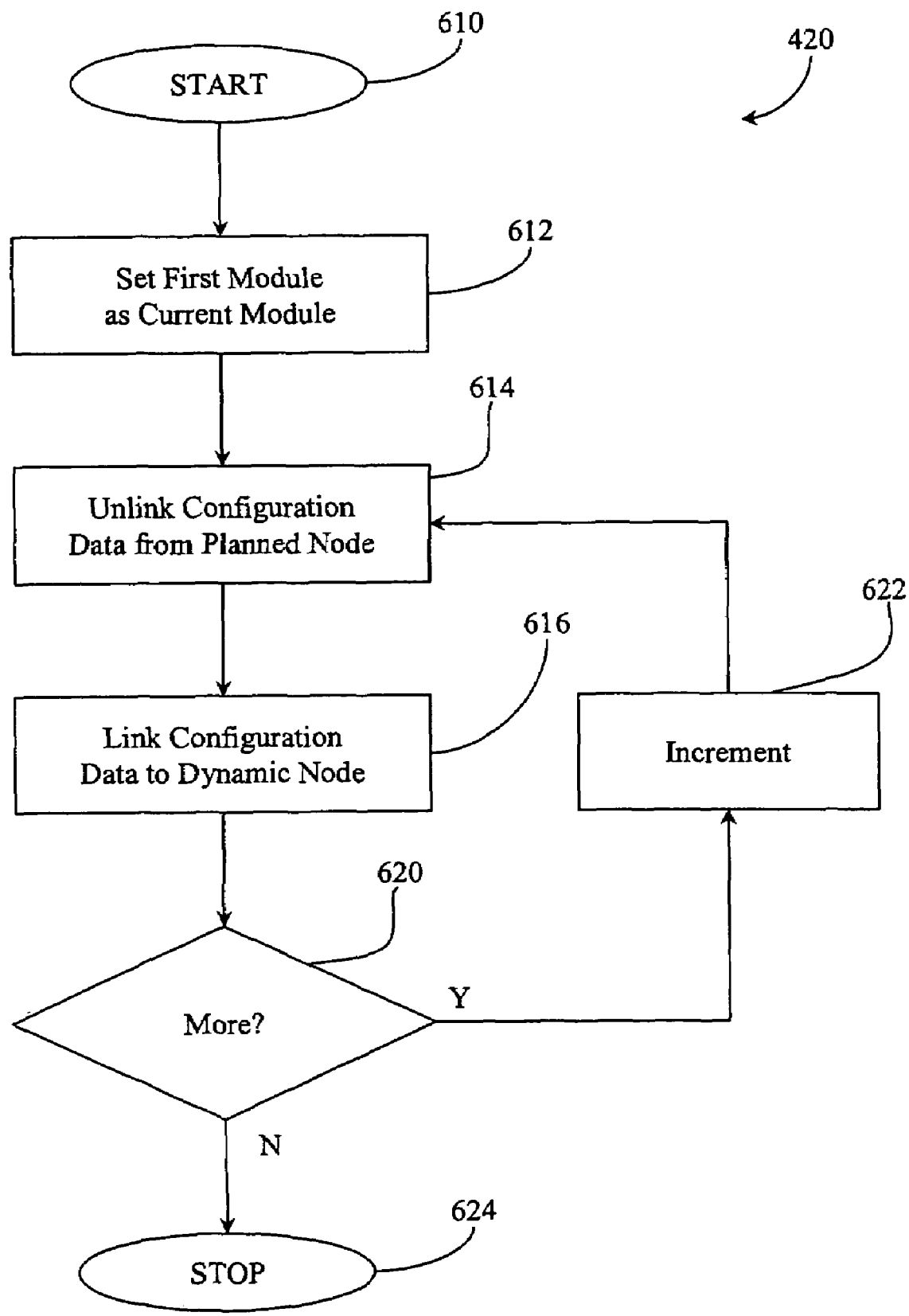
FIG. 6 is an exemplary methodology for registering one or more modules in accordance with one embodiment of the present invention.

Illustrated in FIG. 6 is an exemplary methodology of the block 420 (see FIG. 4) for registering one or more previously identified modules. The process of registering the module(s) starts in a block 610. A first of the modules linked to the planned node 212a (see FIG. 2) having the registration flag set to "Synch" is set as a current module (see block 612). Configuration data for the current module is unlinked from the planned node 212a (see block 614). The configuration data for the current module is linked to the dynamic node 212b (see block 616). It is to be understood that data signals indicating whether the configuration data is successfully unlinked and linked from the respective nodes is transmitted to the storage device 114 for generating appropriate error messages, if necessary. A determination is made whether more modules having the registration flag set to "Synch" are linked to the planned node 212a (see block 620). If more such modules exist, the current module is incremented to the next such module (see block 622). Then, the configuration data for the current module is unlinked from the planned node 212a (see the block 614). Otherwise, if no more modules having the registration flag set to "Synch" exist, the registration process stops (see block 624).

Figure 7:
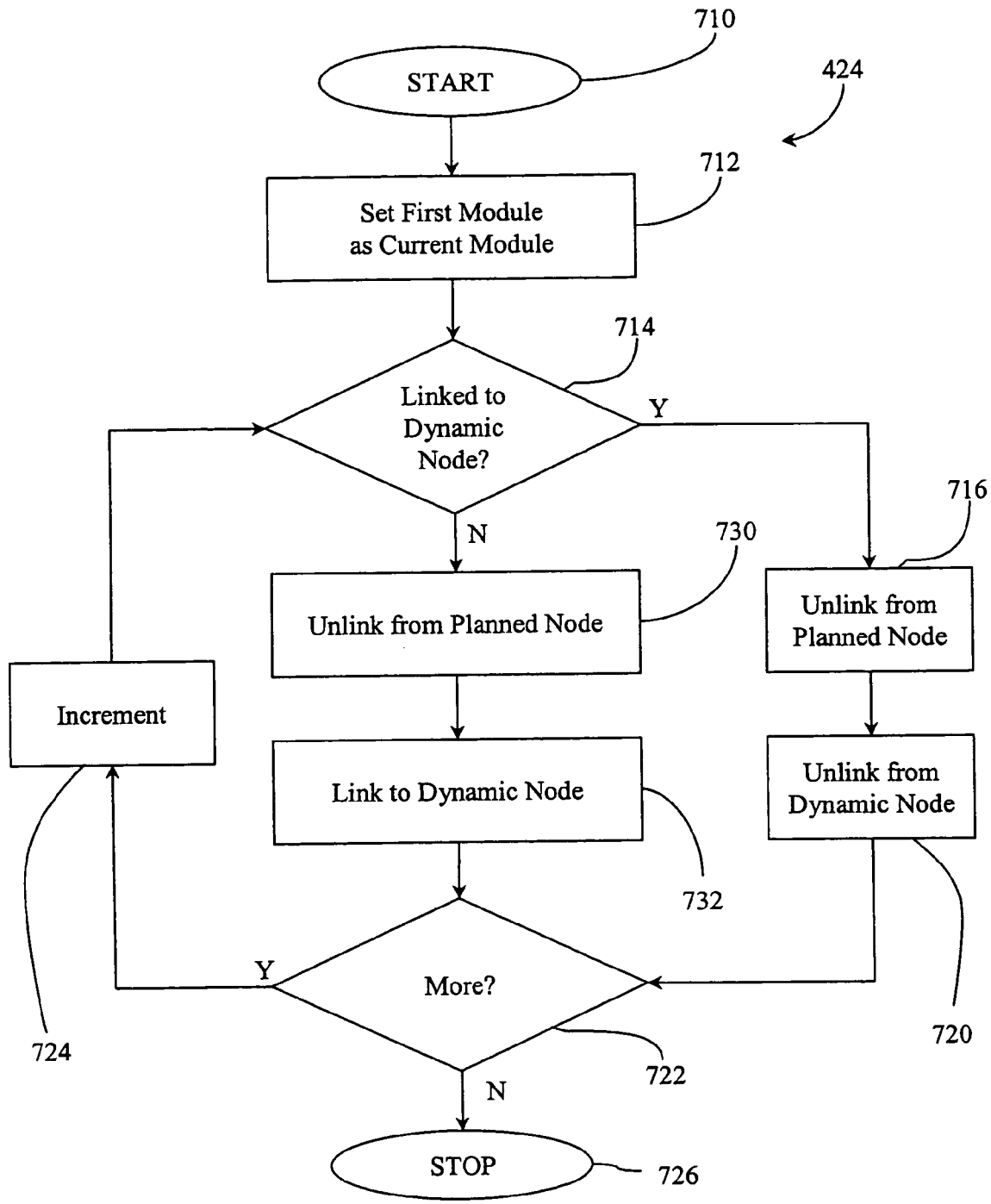
FIG. 7 is an exemplary methodology for registering or unregistering one or more modules during a reboot in accordance with one embodiment of the present invention.

Illustrated in FIG. 7 is an exemplary methodology of the block 424 (see FIG. 4) for rebooting the OS. The process of rebooting starts in a block 710. A first of the modules linked to the planned node 212a having the registration flag set to "ASynch" is set as a current module (see block 712). A determination is made whether the current module is also linked to the dynamic node 212b (see block 714). If the current module is simultaneously linked to both the planned and dynamic nodes 212a, 212b, respectively, the current module is set to be unregistered from the kernel 124 (see FIG. 1). Therefore, the current module is unlinked from the planned node 212a (see block 716). Also, the current module is unlinked from the dynamic node 212b (see block 720). A determination is made whether more modules having the registration flag set to "ASynch" are linked to the planned node 212a (see block 722).

If more modules having the registration flag set to "ASynch" are linked to the planned node 212a, the next of such modules is set as the current module (see block 724). Then, it is determined whether the current module also has configuration data linked to the dynamic node 212b (see the block 714). If, on the other hand, no more modules having the registration flag set to "ASynch" are linked to the planned node 212a (see block 722), the rebooting process stops (see block 726).

If the current module is not simultaneously linked to both the planned and dynamic nodes 212a, 212b, respectively, (see the block 714), the current module is set to be registered with the kernel 128 (see FIG. 1). Therefore, the current module is unlinked from the planned node 212a (see block 730). Also, the current module is linked to the dynamic node 212b (see block 732). The determination is made whether more modules having the registration flag set to "ASynch" are linked to the planned node 212a (see the block 722).

As discussed above, with reference to FIGS. 2 and 3, the modules 214a, 214b, respectively, are unregistered from the kernel and registered with the kernel according to the process described above.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A system for registering and unregistering a module with a kernel, comprising:
    a processing unit executing the kernel; and
    a hierarchical kernel registry service communicating with the kernel and including an identifier of the module, the identifier indicating whether the module is linked to a planned node or a dynamic node, the processing unit causing the module to be one selected from registered with the kernel and unregistered from the kernel as a function of the identifier within the hierarchical kernel registry service.

2. The system for registering and unregistering a module with a kernel as set forth in claim 1, wherein the identifier includes a flag indicating whether the module is to be one selected from registered and unregistered and one selected from synchronously and asynchronously.

3. A system for registering and unregistering a module with a kernel, comprising:
    a processing unit executing the kernel; and
    a hierarchical kernel registry service communicating with the kernel and including an identifier of the module, the processing unit causing the module to be one selected from registered with the kernel and unregistered from the kernel as a function of a hierarchal position of the identifier within hierarchical kernel registry service; wherein:
    the identifier includes a flag indicating whether the module is to be one selected from registered and unregistered and one selected from synchronously and asynchronously;

if the position of the identifier is within a planned branch and the flag indicates to register the module synchronously, the module is registered during a subsequent registration; and
    if the position of the identifier is within a planned branch and the flag indicates to register the module asynchronously, the module is registered during a subsequent kernel build.

4. A system for registering and unregistering a modulo with a kernel, comprising:
    a processing unit executing the kernel; and
    a hierarchical kernel registry service communicating with the kernel and including an identifier of the module, the processing unit causing the modulo to be one selected from registered with the kernel and unregistered from the kernel as a function of a hierarchical position of the identifier within the hierarchical kernel registry service, wherein the module includes configuration data linked to a planned branch of the hierarchical kernel registry service, the configuration data being unlinked from the planned branch of the hierarchical kernel registry service and linked to a dynamic branch of the hierarchical kernel registry service when the module is registered, and the configuration data being unlinked from the planned and dynamic branches when the module is unregistered.

5. The system for registering and unregistering a module with a kernel as set forth in claim 4, further including:
    a storage device communicating with the hierarchical kernel registry service, data indicative of a success of the unlinking and linking of the configuration data being transmitted to, and stored in, the storage device.

6. The system for registering and unregistering a module with a kernel as set forth in claim 1, wherein the hierarchical kernel registry service is represented as binary data.

7. The system for registering and unregistering a module with a kernel of claim 1, further comprising a plurality of nodes that communicate with a common node.

8. A computer program product, comprising a computer readable medium, for managing a module registered with a kernel, comprising:
    computer executable program code for causing a computer to link configuration information for the module to a planned branch of a hierarchical registry system associated with the kernel; and
    computer executable program code for causing the computer to one selected from register the module with the kernel and unregister the module from the kernel as a function of whether the configuration information for the module is currently linked to a dynamic branch of the hierarchical registry system,
    wherein the module is registered with the kernel if the module is not currently linked to the dynamic branch, and unregistered with the kernel if the module is currently linked with the dynamic branch.

9. The computer program product as set forth in claim 8, further comprising computer executable code for allowing two or more branches to communicate with a common node.

10. The computer program product as set forth in claim 8, further comprising computer executable code preventing a module linked to a third branch from being unregistered with the kernel.

11. A computer program product, comprising a computer readable medium, for managing a module registered with a kernel, comprising:
    computer executable program code for causing a computer to link configuration information for the module to a first branch of a hierarchical registry system associated with the kernel; and computer executable program code for causing the computer to one selected from register the module with the kernel and unregister the module from the kernel as a function of whether the configuration information for the module is currently linked to a second branch of the hierarchical registry system, wherein:

if the configuration information for the module is currently not linked to the second branch of the hierarchical registry system, the code causes the computer to register the module with the kernel; and if the configuration information for the module is currently linked to the second branch of the hierarchical registry system, the code causes the computer to unregister the module from the kernel.

12. The computer program product as set forth in claim 11, wherein the code causing the computer to register the module with the kernel includes:

computer executable program code for causing the computer to determine, as a function of the configuration information, whether the module is to be one selected from linked and unlinked and one selected from synchronously and asynchronously.

13. The computer program product as set forth in claim 11, wherein the code causing the computer to register the module with the kernel includes:

computer executable program code for causing the computer to unlink the configuration information from the first branch; and computer executable program code for causing the computer to link the configuration information to the second branch.

14. The computer program product as set forth in claim 11, wherein the code causing the module to be unregistered from the kernel includes:

computer executable program code for causing the configuration information to not be linked to the second branch during a subsequent boot-up of the computer.

15. A computer device for registering and unregistering a plurality of modules with a kernel comprising:

a processor;

a computer readable medium;

a kernel registry system having a hierarchical data structure stored on the computer readable medium, the hierarchical data structure having a common node, a first node and a second node, wherein the first node and the second node communicate with the common node;

executable instructions stored on the computer readable medium causing the processor to:

identify whether a first module is linked to the first node;

identify whether the first module is linked to the second node;

register the first module with the kernel if the first module is linked to the first node and the second node;

identify a second module currently registered with the kernel that is to be unregistered from the kernel;

unlink the second module from the first node; and link the second module to the second node.

16. The computer device of claim 15 further comprising a third node that communicates with the common node; and executable instructions on the computer readable medium that cause the processor to identify a third module that is permanently registered with the kernel and link the third module with the third node.

17. The computer device of claim 16 further comprising executable instructions for preventing the third module linked from being unregistered with the kernel.

18. The computer device of claim 15 further comprising executable instructions on the computer readable medium that cause the processor to register the first module with the kernel before rebuilding the kernel.

19. The computer device of claim 15 further comprising executable instructions on the computer readable medium that cause the processor to unregister the second module with the kernel before rebuilding the kernel.

20. The computer device of claim 15 further comprising executable instructions on the computer readable medium that cause the processor communicate success of an linking or unlinking of a module to a kernel.

* * * * *

UNITED STATES PATENT AND TRADEMARK OFFICE
CERTIFICATE OF CORRECTION

PATENT NO. : 7,272,712 B1　　　　　　　　　　　　　　　　　　　　　　　Page 1 of 1
APPLICATION NO. : 11/605102
DATED : September 18, 2007
INVENTOR(S) : Janet H. Gryck et al.

It is certified that error appears in the above-identified patent and that said Letters Patent is hereby corrected as shown below:

In column 9, line 61, in Claim 3, delete "hierarchal" and insert -- hierarchical --, therefor.

In column 9, line 62, in Claim 3, after "within" insert -- the --.

In column 10, line 9, in Claim 4, delete "modulo" and insert -- module --, therefor.

In column 10, line 14, in Claim 4, delete "modulo" and insert -- module --, therefor.

Signed and Sealed this

Twenty-second Day of July, 2008

JON W. DUDAS
*Director of the United States Patent and Trademark Office*